United States Patent [19]

Deichert et al.

[11] 4,208,362

[45] Jun. 17, 1980

[54] SHAPED BODY OF AT LEAST TWO POLYMERIZED MATERIALS AND METHOD TO MAKE SAME

[75] Inventors: William G. Deichert, Webster; Joseph J. Falcetta, Pittsford; Kai C. Su, Webster, all of N.Y.

[73] Assignee: Bausch & Lomb Incorporated, Rochester, N.Y.

[21] Appl. No.: 667,833

[22] Filed: Mar. 22, 1976

Related U.S. Application Data

[63] Continuation-in-part of Ser. No. 569,721, Apr. 21, 1975, abandoned.

[51] Int. Cl.² .............................................. B29D 11/00
[52] U.S. Cl. ....................................... 264/1; 264/162; 264/255; 264/343; 351/160 H; 351/177
[58] Field of Search ........................ 264/1, 255, 2, 162, 264/343; 425/808; 351/160, 177

[56] References Cited

U.S. PATENT DOCUMENTS

| | | | |
|---|---|---|---|
| 3,489,491 | 1/1970 | Creighton | 264/1 |
| 3,804,366 | 4/1974 | Rubright | 264/255 |
| 3,925,178 | 12/1975 | Gisser | 351/160 |
| 3,961,379 | 6/1976 | Highgate | 351/160 |

FOREIGN PATENT DOCUMENTS

| | | | |
|---|---|---|---|
| 1045065 | 10/1966 | United Kingdom | 264/1 |
| 1412439 | 11/1975 | United Kingdom. | |

*Primary Examiner*—James B. Lowe
*Attorney, Agent, or Firm*—Ronald L. Lyons; Frank C. Parker

[57] ABSTRACT

A shaped body is manufactured from at least two polymerized materials with one polymerized material being swellable relative to the other polymerized material. The shaped body is formed having sections of the first material, the second material and a substantially random copolymer of the first and second materials as a transition section between the first and second sections.

10 Claims, 18 Drawing Figures

SHAPED BODY OF AT LEAST TWO POLYMERIZED MATERIALS AND METHOD TO MAKE SAME

BACKGROUND AND BRIEF DESCRIPTION OF THE INVENTION

This application is a continuation-in-part of our application Ser. No. 569,721, filed Apr. 21, 1975 and now abandoned.

A relatively recent development in the manufacture of contact lenses has been the manufacture of a lens with a relatively hard center section circumscribed by a relatively soft and wettable edge section. The major difficulties encountered when using these lenses involves the physical properties of the materials used in manufacturing the center and edge sections. That is, the material used in the center section is normally a relatively hard hydrophobic material and the material used in the edge section is a relatively soft hydrophilic material. The edge section of such a contact lens will therefore expand or swell relative to the center section when the hydrophilic material absorbs water. This swelling generates stresses between the edge and center sections which creates a lens having an irregular shaped edge. Accordingly, the contact lens may no longer "fit" the wearer's eye nor be functional to correct the wearer's vision.

One method devised to compensate for these stresses has been to provide a center section insert containing the relatively hard material for placement within the relatively soft wettable edge section. Generally, these center section inserts have a surface matching with a surface of the edge section for mechanically retaining the center section within the edge section. An example of a contact lens using such a method is illustrated in U.S. Pat. No. 3,488,111 issued to A. A. Isen. Because of the possible separation and subsequent loss of one of these sections while handling the contact lens, we believe a direct connection between the relatively hard center section and the relatively soft wettable edge section is preferred. This direct connection has been accomplished by using epoxy cement, by ultrasonic means or by graft polymerization, as described by C. P. Creighton in U.S. Pat. No. 3,489,491 and P. M. Kamath in U.S. Pat. No. 3,619,044. Such direct connecting techniques may also be adversely effected by the hydrophilic material of the edge section swelling relative to the hydrophobic material of the center section. This swelling may generate strains within these direct connections which tend to weaken such bonding after swelling. Accordingly, a contact lens having these direct connections must be handled very carefully to prevent severance of the connection and a possible resulting loss of the hydrophilic edge section.

We construct our contact lens with a center section of relatively hard transparent polymerized material and an edge section of a relatively soft hydrated transparent hydrophilic polymerized material circumscribing the center section. A transition section of a substantially random copolymer provides the direct connection between the center and edge sections of our contact lens. We have found this transition section provides a bond of sufficient strength to maintain the connection between the center and edge sections even when the hydrophilic material becomes stressed.

BRIEF DESCRIPTION OF THE DRAWINGS

Objects and advantages will become apparent upon reading the following detailed description and upon reference to the drawings, in which like reference numerals refer to like elements in different figures and.

DETAILED DESCRIPTION OF THE INVENTION

Figure 1:
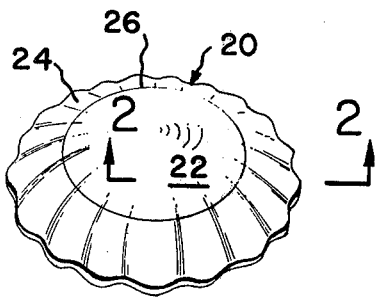
FIG. 1 is a perspective view of a prior art hard center-wettable edge contact lens with the edge section illustrated when stressed.
Figure 2:
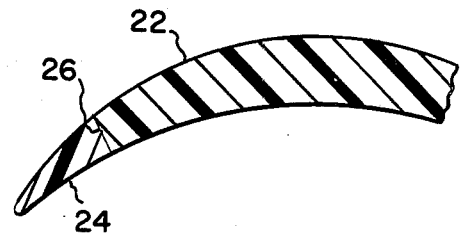
FIG. 2 is an enlarged sectional, elevational view taken along line 2—2, in the direction of the arrows, of the prior art contact lens of FIG. 1.

Turning first to FIGS. 1 and 2, there is shown a prior art contact lens 20. As illustrated, a center section 22 is circumscribed by an edge section 24 and joined at junction 26. The materials used in center section 22 are normally hard transparent hydrophobic plastics, while the materials used in edge section 24 are hydrophilic plastics. As described in the prior art, a hydrophilic plastic is wettable and becomes relatively soft upon hydration. However, these hydrophilic plastics also swell upon hydration. As explained above, in the event the hydrophilic plastic of edge section 24 swells relative to the directly bonded hydrophobic plastic of center section 22, stresses are created in edge section 24 and strains are created between the materials at junction 26. As is known, an aqueous solution is associated with the eye (tear fluid). The hydrophilic plastic of edge section 24 will therefore become hydrated when positioned on the user's eye. Accordingly, a contact lens may no longer be functional because of the irregular shape of edge section 24 and the lens must be treated with a greater degree of care than normally exercised by a user.

Figure 3:
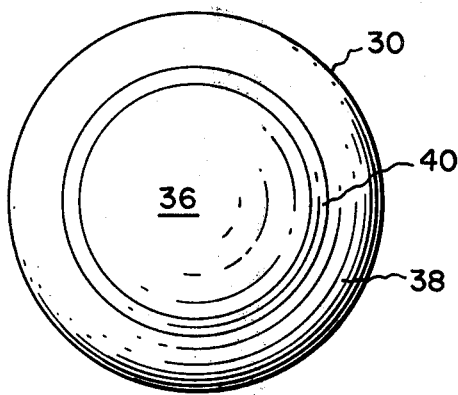
FIG. 3 is a plan view illustrating an embodiment of our present invention.
Figure 4:
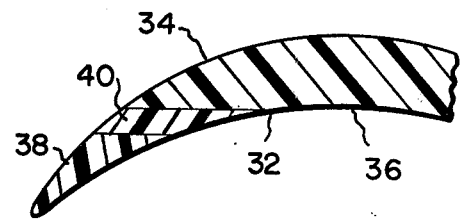
FIG. 4 is an enlarged sectional, elevational view of the embodiment illustrated in FIG. 3 with the edge section illustrated when unstressed.
Figure 5:
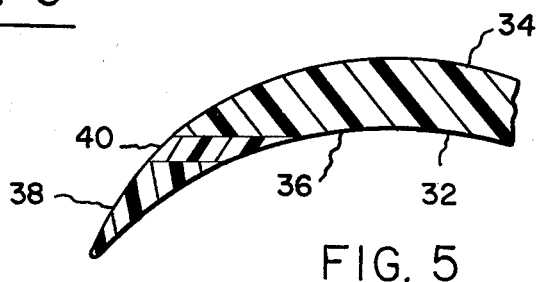
FIG. 5 is an enlarged sectional, elevational view of the embodiment illustrated in FIG. 3 with the edge section illustrated when stressed.
Figure 6:
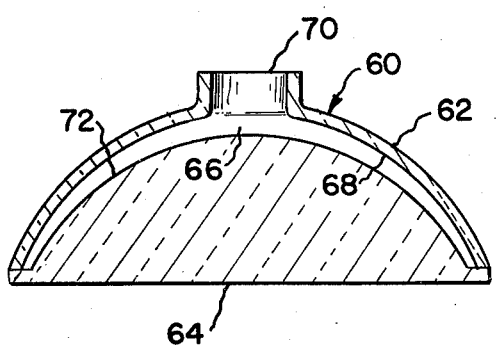
FIGS. 6–11 are sectional, elevational views of different steps in a process to manufacture the embodiment of our invention illustrated in FIG. 3.
Figure 7:
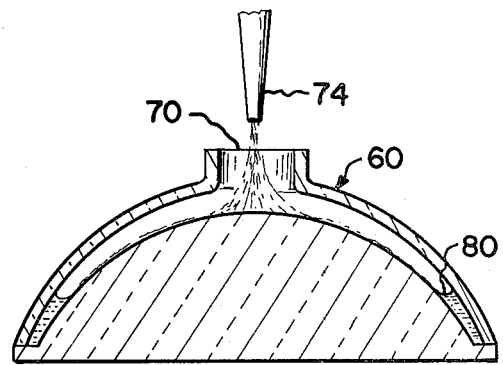
Figure 8:
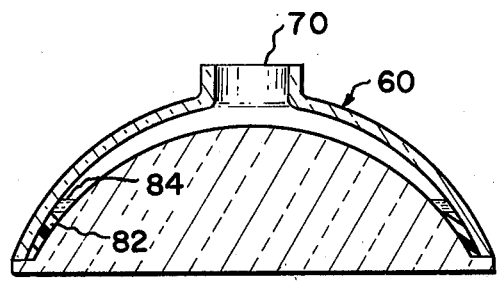
Figure 9:
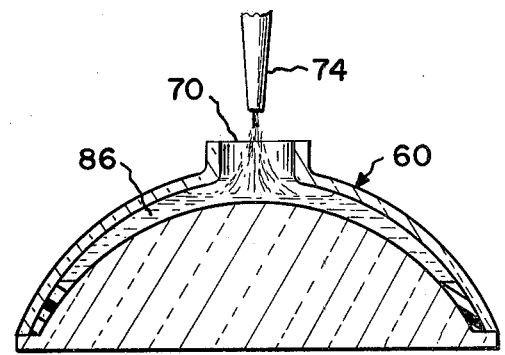
Figure 10:
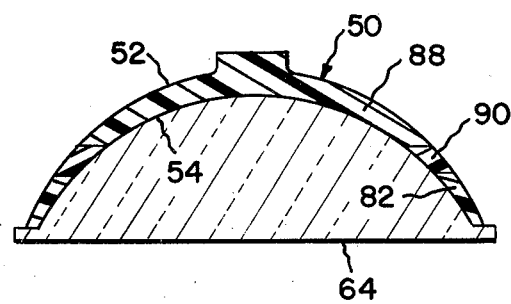
Figure 11:
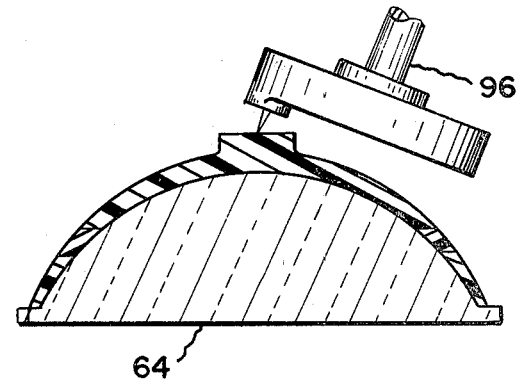

As illustrated in FIGS. 3–5, our contact lens 30 has a corneal side 32 and an anterior side 34, a center section 36, an annular edge section 38, and an annular transition section 40. The material we use in center section 36 is a relatively hard plastic selected because of its physical characteristics. Preferably, the material has a visible light transmittance greater than 90 percent following the Standard Method of Test for Transparency of Plastic Sheeting (ASTM D 1746-70). We also prefer a material having physiological inertness as demonstrated by noncytotoxicity. Some polymerized materials that may be used in center section 36 are the acrylic polymers. These polymers are preferably made from monomers well recognized in the art and have a vinyl group. Illustrative of these monomers polymerizable into homopolymers are methyl methacrylate, ethyl methacrylate, isopropyl methacrylate, s-butyl methacrylate, t-butyl methacrylate, phenyl methacrylate, cyclohexyl methacrylate, 3,3,5-trimethylcyclohexyl methacrylate and t-butyl acrylate, tetrahydrofurfuryl methacrylate, allyl methacrylate, cyclohexyl acrylate, tetraethylene glycol dimethacrylate, triethylene glycol dimethacrylate, tetraethylene glycol diacrylate, triethylene glycol diacrylate, tetrahydrofurfuryl acrylate, neopentyl glycol diacrylate and others. Copolymers are also useable in center section 36 by combining two or more of these monomers. When desired, cross-linking monomers may be added to the above monomers for varying the degree of cross-linking in the polymers. Illustrative of these cross-linking monomers are ethylene glycol dimethacrylate, ethylene glycol diacrylate, pentaerythritol tetracrylate, trimethylolpropane trimethacrylate and others. We prefer using from 70 to 100 percent by weight of the material used in center section 36 to be one or more members selected from the group consisting of methyl methacrylate, tetrahydrofurfuryl methacrylate and cyclohexyl methacrylate and from 0 to 30 percent by weight of the material used in center section 36 to be one or more members selected from the group of ethylene glycol dimethacrylate, diethylene glycol dimethacrylate, triethylene glycol dimethacrylate, and tetraethylene glycol dimethacrylate.

The material we use in edge section 38 when manufacturing our contact lens 30 is a hydrophilic plastic having physiological inertness as illustrated by non-cytotoxicity and preferably good visible light transmittance. The hydrophilic polymerized material is wettable, swells during hydration and becomes relatively soft upon hydration (i.e., a Shore hardness of 60 or less on the A scale). A three-dimensional sparingly cross-linked polymer that may be used may be made from one or more monomers selected from the group consisting of a polymerizable ester and amide of acrylic or methacrylic acid having at least one hydrophilic functional group and vinylpyrrolidone and a slight amount of acrylic or methacrylic esters of polyols having from 2 to 8 hydroxyl groups. The polymer we prefer is made by the free radical polymerization of monomers of hydroxyalkyl methacrylate, the alkyl group having from 2 to 3 carbon atoms, and from about 0.1 to 2 percent by weight of the selected monomer of a dimethacrylic ester of a glycol having 2 to 3 carbon atoms.

The materials used in forming center section 36 and edge section 38, when polymerized, form a substantially random copolymer therebetween, consisting of both of the original materials, called transition section 40. By using a substantially random copolymer in transition section 40, we have found that a bond is provided of sufficient strength to maintain the connection between center section 36 and edge section 38 even though stresses develop through section 40 as the hydrophilic material swells. We believe this connection is maintained because transition section 40 of our contact lens 30 is less abrupt than junction 26 of prior art contact lens 20. It appears that this permits the stresses created as the hydrophilic material expands or contracts relative to the hydrophobic material to be spread across this greater thickness.

A method we employ to manufacture a shaped body of at least two polymerized materials (such as, a contact lens, a semi-finished lens blank or a contact lens "button") is to provide a first polymerizable material in a mold. The mold forms at least two sides of the shaped body and the first material has a surface free of contact with the mold. An inhibitor is provided, preferably a gas such as oxygen or air, in juxtaposition with the free surface of the first material. The first polymerizable material is then polymerized while inhibiting the polymerization in the inhibited portion to obtain polymerized and unpolymerized portions of the first material. A second polymerizable material is added to the mold and the inhibitor is removed. The unpolymerized portion of the first material and the second material are then polymerized to form a shaped body having a section of the first polymerized material, a transition section of a substantially random copolymer of the first and second materials and a section of the second polymerized materials.

As stated above, we believe the strength of the connection between center section 36 and edge section 38 to depend on the extent of transition section 40. Transition section 40 is illustrated enlarged to aid in understanding why the strength of the connection depends on the extent of the transition section. In using the above method to manufacture the shaped body, the extent of the transition section can be modified by manipulating certain variables. One of these variables depends on the relationship between the polymerizable materials used and the type and/or amount of inhibitor used. Since we prefer using oxygen or air as the inhibitor during polymerization of the selected polymerizable materials, we normally vary the amount of inhibitor to manipulate the extent of transition section 40. Another of these variables depends on the time used when polymerizing the first polymerizable material, while a third of these variables depends on the polymerization rate of the polymerizable materials. As is manifest, these two variables depend on the polymerizable materials being polymerized, the polymerization technique used in polymerization and the initiators used with the polymerizable materials during polymerization. With the materials we have selected from which our contact lens 30 is manufactured, we use free radical polymerization techniques, such as photochemical or thermal polymerization, and conventional initiators and activators, such as di(sec-butyl) peroxydicarbonate, axobisisobutyronitrile and benzoin methyl ether. Accordingly, the polymerization time and rate variables necessary to obtain a connection of sufficient extent for obtaining the improved direct connection of our contact lens 30 are determinable through conventional experimentation.

We have also substantially eliminated stresses in edge section 38 of our contact lens 30 when the lens is inserted in a user's eye. This stress elimination is accomplished by our novel method of manufacturing a shaped body having at least two polymerized materials with one of the materials being swellable relative to the other polymerized material. The method involves providing one of the polymerized materials for a first section of the shaped body. The swellable polymerized material for a second section of the shaped body is then provided in a swollen condition. The swollen polymerized material and the other polymerized material are then connected in accordance with the invention. In our contact lens 30, the hydrophilic material used in edge section 38 is the swellable material, the non-swollen material used in center section 36 is the other material and preferably the swelling agent is water. Accordingly, this method of manufacture permits edge section 38 to be substantially unstressed when contact lens 30 is being used because the wearer's tear fluid provides sufficient water to keep the hydrophilic material swollen.

Although the above two methods of manufacture may be used separately to form a shaped body or contact lens, we prefer combining the methods. We do this by providing the swelling agent in the mold with the polymerizable material that forms the swellable polymerized material. This polymerizable material will, therefore, be in the swollen state upon completion of polymerization. Also, we prefer limiting the amount of the swelling agent in the mixture of swellable polymerizable material and swelling agent to that substantial amount necessary to suitably swell the swellable polymerized material. When the swelling agent is water and the swellable polymerized material is poly (2-hydroxyethyl methacrylate), the amount of swelling agent suitable is between 35 and 40 percent.

Turning now to FIGS. 6–11, wherein a preferred method of manufacturing contact lens 30 from a shaped body 50 is illustrated. In this embodiment, shaped body 50 is illustrated as having a convex surface 52 and a concave surface 54 and is formed in a mold 60. Mold 60 is constructed with a top half 62 and a bottom half 64 with a cavity 66 formed therebetween. Top half 62 has a concave surface 68 and an access chimney 70 leading to cavity 66. Concave surface 68 forms convex surface 52 of shaped body 50 and chimney 70 is provided for admission of the polymerizable materials into cavity 66. Also, a convex surface 72 is provided on bottom half 64 of mold 60 to form concave surface 54 of shaped body 50. A syringe 74 is illustrated as the means to add the polymerizable materials to cavity 66 of mold 60.

To manufacture shaped body 50, a selected quantity of mixture 80, a first swellable and polymerizable material and a swelling agent, is provided in cavity 66 by syringe 74 through chimney 70. An agent to inhibit polymerization of the first material is then admitted to cavity 66 above mixture 80. The first material in mixture 80 is then polymerized to form a polymerized portion 82 and a partially polymerized portion 84. Second material 86 is then added via chimney 70 by syringe 74 to cavity 66 of mold 60. The material in partially polymerized portion 84 and second material 86 are then polymerized to form shaped body 50 having polymerized portion 82 of the first material, polymerized material 88 of second material 86 and a substantially random copolymer 90 of the first material and second material 86.

In this embodiment, concave surface 54 of shaped body 50 is formed by convex surface 72 of mold 60 to give corneal side 32 of lens 30, thereby forming a semi-finished lens blank. The manufacture of contact lens 30 is then completed by machining convex surface 52 of body 50 to form anterior side 34. An advantage in forming a semi-finished lens blank is that a contact lens is completely manufactured by machining only one surface or a portion thereof, although an edging operation of the lens may be required.

Figure 12:
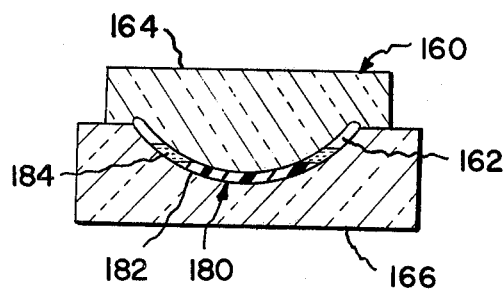
FIGS. 12 and 13 are sectional, elevational views of different steps in a second process used to manufacture the embodiment of our invention illustrated in FIG. 3.
Figure 13:
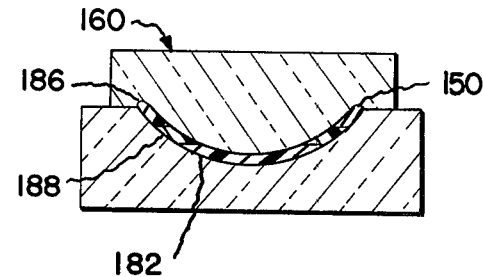

The steps in forming a shaped body 150 directly into contact lens 30 is illustrated in FIGS. 12 and 13. In this embodiment, a mold 160 having a cavity 162 disposed between a top half 164 and a bottom half 166 substantially forms shaped body 150 into contact lens 30. Top half 164 has a convex surface 168 to form corneal side 32 of lens 30, while bottom half 166 has a concave surface 170 to form anterior side 34. Since no hole is provided for access into cavity 162, the quantity of each material inserted into cavity 162 is carefully measured.

As shown, a first material 180 is provided within cavity 162 of mold 160. Air, having oxygen to inhibit polymerization, is provided above and in juxtaposition to first material 180. First material 180 is then polymerized to form a polymerized portion 182 and a partially polymerized portion 184. A mixture of the second polymerizable and swellable material and the swelling agent is then added to cavity 162 of mold 160 and polymerized into a second polymerized material 186. Shaped body 150 is thus formed having a polymerized portion 182 of first material 180, a substantially random copolymer 188 of the first and second materials and polymerized second material 186. Since shaped body 150 is directly formed into our contact lens 30, polymerized portion 182 is center section 36, substantially random copolymer 188 is transition section 40 and polymerized second material 186 is edge section 38. One difference between this embodiment and that illustrated in FIGS. 6–11 is the direct molding of the shaped body into a contact lens. Another difference is the first polymerizable material added to the mold forms center section 36 of our contact lens 30. A third difference is the use of the inhibiting agent on the material used in center section 36.

Figure 14:
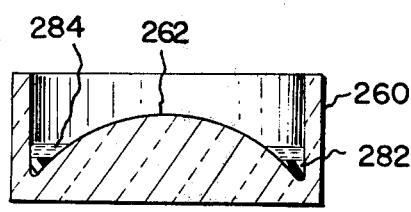
FIGS. 14 and 15 are sectional, elevational views of different steps in a third process used to manufacture the embodiment of our invention illustrated in FIG. 3.
Figure 15:
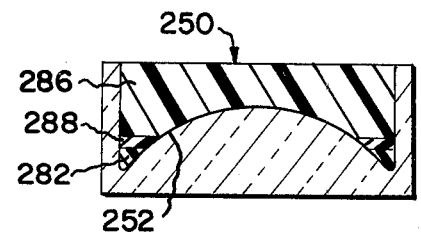

In the embodiment illustrated in FIGS. 14 and 15, a shaped body 250 having a concave surface 252 is manufactured in a single piece mold 260 to form a semi-finished lens blank. Concave surface 252 is formed by a convex surface 262 in mold 260 and will be corneal surface 32 upon complete manufacture of contact lens 30. A top is not necessary for mold 260 because the gas inhibiting polymerization in the first polymerizable material is an oxygen containing gas, such as air.

A mixture of the first polymerizable and swellable material and swelling agent is added to mold 260 and polymerized to obtain a polymerized portion 282 and a partially polymerized portion 284. A second polymerizable material is then added to the mold and polymerized. Accordingly, the shaped body 250 is formed having a first polymerized material 282, a second polymerized material 286 and a substantially random copolymer 288. The semi-finished lens blank would then be machined, as explained in connection with FIG. 11, to form anterior side 34 of contact lens 30. Therefore, polymerized material 282 is used in edge section 38 of contact lens 30, polymerized material 286 is used in center section 36, and substantially random copolymer 288 is used in transition section 40. The main differences between this embodiment and that illustrated in FIGS. 6–11 are the form of the shaped bodies and the use of a one piece mold.

Figure 16:
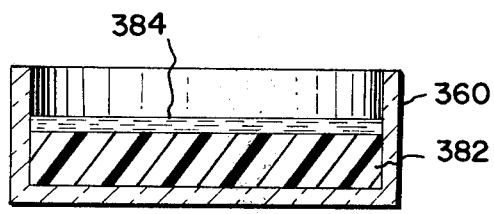
FIGS. 16–18 are sectional, elevational views of different steps in a fourth process used to manufacture the embodiment of our invention illustrated in FIG. 3.
Figure 17:
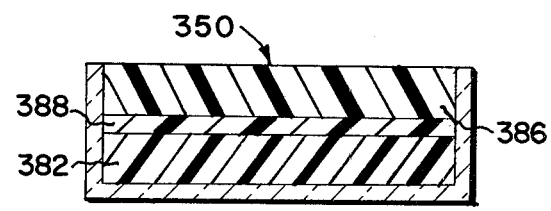
Figure 18:
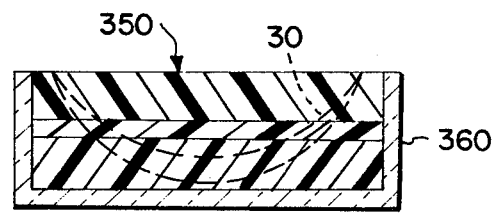

A final embodiment of our invention is illustrated in FIGS. 16–18, wherein a shaped body 350 in the form of a contact lens button is manufactured. A one piece mold 360 is used, as in FIGS. 14 and 15, with the exception that no convex surface is provided in the bottom of mold 360. A first material is added to mold 360 followed by an inhibiting agent provided in juxtaposition with the first material. The first material is then polymerized to form a polymerized portion 382 and a partially polymerized portion 384. A second material is then added to mold 360 and polymerized to form polymerized material 386. Shaped body 350 would be formed having a first polymerized portion 382, a second polymerized portion 386, and a substantially random copolymer 388 of the first and second materials. Contact lens 30 is then formed by machining, such as by lathing, grinding or cutting.

The order in which the materials are added to mold 360 determines the orientation of contact lens 30 in button 350. For example, when selecting the first material added to mold 360 for use as relatively hard transparent center section 36 and the second material added to mold 360 for use as wettable edge section 38, the contact lens 30 will be orientated in button 350 as illustrated in FIG. 18 by the dotted outline. However, when selecting the first material added to mold 360 for use as wettable edge section 38 and the second material added to mold 360 for use as relatively hard transparent center section 36, the contact lens 30 will be orientated in button 350 diametrically opposed to the dotted outline illustrated in FIG. 18.

The following examples are given to illustrate connecting selected materials to obtain a transparent hard center-wettable edge contact lens with the parts and percentages being by weight unless otherwise indicated. These examples are given as illustrative only with no intention of our limiting the invention to the specific details thereof.

EXAMPLE I

A first mixture of 60 parts 2-hydroxyethyl methacrylate with approximately 0.4 percent ethylene glycol dimethacrylate and 0.2 percent benzoin methyl ether and 40 parts water was provided in a mold. Air was admitted into the mold under atmospheric pressure and the mixture was irradiated with ultraviolet (UV) light for 10 minutes. A second mixture of 90 parts methyl methacrylate syrup (10 parts poly(methyl methacrylate) having a molecular weight of approximately 200,000 dissolved in 90 parts of methyl methacrylate) and 10 parts tetraethylene glycol dimethacrylate and approximately 0.2 parts benzoin methyl ether was added to the mold. The mold was then positioned under a nitrogen atmosphere and the mixtures were irradiated with UV for 12 minutes.

EXAMPLE II

The first mixture provided in a mold and procedure followed with the first mixture in the mold is identified in Example I. The second mixture added to the mold consisted of 70 parts of the methyl methacrylate syrup identified in Example I and 30 parts of tetraethylene glycol dimethacrylate. The remaining procedure is identified in Example I.

EXAMPLE III

A first mixture of 60 parts 2-hydroxyethyl methacrylate with approximately 0.4 percent ethylene glycol methacrylate and 0.2 percent benzoin methyl ether and 40 parts of a solution of 0.89 percent NaCl in water was provided in a mold. Air was admitted into the mold under atmospheric pressure and the mixture was irradiated with UV for 6 minutes. A second mixture of 95 parts tetrahydrofurfuryl methacrylate and 5 parts ethylene glycol dimethacrylate and approximately 0.2 parts benzoin methyl ether was then added to the mold, positioned under a nitrogen atmosphere and irradiated with UV for 15 minutes.

EXAMPLE IV

A first mixture of 65 parts 2-hydroxyethyl methacrylate with approximately 0.4 percent ethylene glycol dimethacrylate and 0.2 percent benzoin methyl ether and 35 parts of a solution of 0.89 percent NaCl in water was provided in a mold. The remaining procedure and second mixture are identified in Example III.

EXAMPLE V

The first mixture provided in a mold and procedure followed with the first mixture in the mold are identified in Example I. The second mixture added to the mold consisted of 90 parts tetrahydrofurfuryl methacrylate and 10 parts ethylene glycol dimethacrylate and approximately 0.2 parts benzoin methyl ether. The remaining procedure is identified in Example III.

EXAMPLE VI

The first mixture provided in a mold is identified in Example I. Oxygen was admitted into the mold under atmospheric pressure and the mixture was irradiated with UV for 30 minutes. A second mixture of 100 parts of the methyl methacrylate syrup, identified in Example I, with approximately 0.2 percent benzoin methyl ether was then added to the mold and irradiated with UV for 20 minutes.

EXAMPLE VII

The first mixture provided in a mold and procedure followed with the first mixture provided in the mold are identified in Example VI. The second mixture added to the mold consisted of the methyl methacrylate syrup identified in Example I diluted 1:1 with methyl methacrylate. The remaining procedure is identified in Example VI.

EXAMPLE VIII

The first mixture provided in a mold and procedure followed with the first mixture in the mold is identified in Example I. The second mixture added to the mold consisted of 100 parts cyclohexyl methacrylate and approximately 0.2 parts benzoin methyl ether. The remaining procedure is identified in Example I.

EXAMPLE IX

A first mixture of 100 parts cyclohexyl methacrylate with approximately 0.2 percent benzoin methyl ether is provided in a mold. Air was admitted into the mold under atmospheric pressure and the mixture was irradiated with UV for 6 minutes. A second mixture of 60 parts 2-hydroxyethyl methacrylate with approximately 0.4 percent ethylene glycol dimethacrylate and 0.2 parts benzoin methyl ether and 40 parts water was added to the mold, positioned under a nitrogen atmosphere and irradiated with UV for 10 minutes. This procedure differs from the previous procedures because the swellable material is polymerized after the hard material has been polymerized.

We claim:

1. A method of manufacturing a shaped body for eventual use as a contact lens comprising at least two polymerized materials, comprising:
   providing a first polymerizable material in a mold, said mold having a convex surface therein, said material being capable of forming a relatively swellable polymerized material a portion of said material forming a surface free of contact with the mold said polymerizable material not completely covering said convex surface in said mold;
   providing a swelling agent in the mold with the first polymerizable material;

polymerizing a portion of the first material while inhibiting polymerization of the surface portion of the first material to obtain polymerized and unpolymerized portions of the first material;

adding a second polymerizable material to the mold said second material contacting the surface of the first material, the second material being relatively hard when polymerized; and polymerizing the unpolymerized portion of the first material and the second material to obtain a shaped body having a polymerized edge section of the first material, a polymerized section of a substantially random copolymer of the first and second materials and a polymerized center section of the second material.

2. The method of claim 1, wherein the amount of swelling agent used is limited to that amount necessary to suitably swell the first material.

3. The method of claim 2, wherein the first material is a sparingly cross-linked poly (2-hydroxyethyl methacrylate), the swelling agent is water and the amount of water used is between 35 and 40 percent of the total weight of a mixture of the first material and water.

4. The method of claim 1, wherein the polymerized material used in the edge section is selected to be relatively soft when combined with a swelling agent, the polymerized material used in the center section is selected to be relatively hard and transparent and the configuration of the mold is selected to substantially form the shaped body into a contact lens.

5. The method of claim 1, wherein the polymerized material used in the edge section is selected to be relatively soft when combined with a swelling agent, the polymerized material used in the center section is selected to be relatively hard and transparent and the materials are machined to substantially form the shaped body into a contact lens.

6. The invention according to claim 1 in which said mold has a top half having a concave surface therein, said concave surface being juxtaposed to said convex surface of said mold so as to provide a curved exterior surface on the portion of said shaped body comprised of said second polymerizable material.

7. The invention according to claim 1 in which the first polymerizable material is hydrophilic and the second polymerizable material is hydrophobic.

8. A method of manufacturing a shaped body for eventual use in a contact lens comprising at least two polymerized materials, comprising:

providing a first polymerizable material in a mold, said material being capable of forming a relatively soft swellable polymerized material, a portion of said material forming a surface portion that is free of contact with the mold;

providing a swelling agent in the mold with the first polymerizable material;

polymerizing a portion of the first material while inhibiting polymerization of the surface portion of the first material to obtain polymerized and unpolymerized portions of the first material;

removing the means of inhibiting polymerization of the surface portion of the first material;

adding a second polymerizable material to the mold, said second material contacting the surface of the first material, said second material being relatively hard when polymerized; and polymerizing the unpolymerized portion of the first material and the second material to obtain a shaped body having a section of the first polymerized material, a transition section of a substantially random copolymer of the first and second materials, and a section of the second polymerized material.

9. The invention according to claim 8 in which said first polymerizable material is hydrophilic and said second polymerizable material is hydrophobic.

10. The invention according to claim 8 involving the additional step of:

machining at least one of the polymerized materials to obtain a contact lens having an edge section of the first polymerized material, a polymerized section of a substantially random copolymer of the first and second polymerized materials and a center section of the second polymerized material.

* * * * *